United States Patent
Peng

(10) Patent No.: US 7,706,310 B2
(45) Date of Patent: *Apr. 27, 2010

(54) METHOD FOR ESTABLISHING IPOA CHANNEL-BASED OPERATION AND MAINTENANCE CHANNELS

(75) Inventor: Jianhua Peng, Shenzhen (CN)

(73) Assignee: Huawei Technologies Co., Ltd., Guangdong (CN)

(*) Notice: Subject to any disclaimer, the term of this patent is extended or adjusted under 35 U.S.C. 154(b) by 1594 days.

This patent is subject to a terminal disclaimer.

(21) Appl. No.: 10/493,438

(22) PCT Filed: Mar. 13, 2002

(86) PCT No.: PCT/CN02/00157

§ 371 (c)(1),
(2), (4) Date: Oct. 15, 2004

(87) PCT Pub. No.: WO03/036838

PCT Pub. Date: May 1, 2003

(65) Prior Publication Data

US 2005/0041638 A1    Feb. 24, 2005

(30) Foreign Application Priority Data

Oct. 25, 2001    (CN) ................. 01 1 36795

(51) Int. Cl.
*H04B 7/00*    (2006.01)
(52) U.S. Cl. ..................................... 370/310
(58) Field of Classification Search ............ 370/310, 370/252, 322, 326, 341, 346, 349, 352, 397, 370/498; 455/423, 524; 709/227
See application file for complete search history.

(56) References Cited

U.S. PATENT DOCUMENTS 5,537,411 A * 7/1996 Plas .................... 370/397
(Continued)

FOREIGN PATENT DOCUMENTS

CN    1159877 C    7/2004
(Continued)

OTHER PUBLICATIONS

Rehbehn et al; "Definitions of Managed Objects for Monitoring and Controlling the Frame Relay/ATM PVC Service Interworking Function;" Internet Society; Oct. 2000.*
(Continued)

*Primary Examiner*—Dmitry H Levitan
(74) *Attorney, Agent, or Firm*—Brinks Hofer Gilson & Lione

(57) ABSTRACT

This invention discloses a method for establishing IPOA channel-based maintenance channels. The invention establishes an IPOA channel between a base station and a base station controller with configuration of the base station. A BOOTP request is initiated from the base station to an operation and maintenance center, and the base station obtains an IP address assigned to it from a response sent from the operation and maintenance center, so that an operation and maintenance channel is established between the base station and the base station controller. The invention can solve automatic base station launching problem, and can prevent IP address conflicts and implement parallel launching of base stations. In addition, with the method described in this invention, operation of establishing maintenance channels is simple, light in workload, and reliable. Thus, program and data auto-loading as well as configuration and maintenance of base station(s) at far end (i.e., the operation and maintenance center) can be achieved. The method described in this invention is superior in quality and low cost in maintenance, and can be applied to various networking patterns, such as star-type, chain-type, and tree-type networks.

11 Claims, 3 Drawing Sheets

U.S. PATENT DOCUMENTS

| | | | |
|---|---|---|---|
| 5,867,481 A | 2/1999 | Miyagi | |
| 6,263,206 B1 | 7/2001 | Potochniak et al. | |
| 6,317,421 B1 * | 11/2001 | Wilhelmsson et al. | 370/328 |
| 6,532,217 B1 * | 3/2003 | Alkhatib et al. | 370/252 |
| 6,654,388 B1 * | 11/2003 | Lexenberg et al. | 370/498 |
| 6,898,425 B1 * | 5/2005 | Wilhelmsson et al. | 455/423 |
| 6,982,953 B1 * | 1/2006 | Swales | 370/218 |
| 7,006,478 B1 * | 2/2006 | Mizell et al. | 370/338 |
| 7,307,968 B2 * | 12/2007 | Niemela et al. | 370/329 |
| 7,472,176 B2 * | 12/2008 | Gu | 709/220 |
| 2001/0032265 A1 * | 10/2001 | Tanaka | 709/227 |
| 2001/0053145 A1 * | 12/2001 | Willars et al. | 370/352 |
| 2002/0123365 A1 * | 9/2002 | Thorson et al. | 455/524 |

FOREIGN PATENT DOCUMENTS

| | | |
|---|---|---|
| JP | 2001-145152 A | 5/2001 |
| WO | WO 95/01025 A1 | 1/1995 |
| WO | WO 97/48210 | 12/1997 |
| WO | WO 01/52570 A2 | 7/2001 |
| WO | WO 02/15490 A1 | 2/2002 |

OTHER PUBLICATIONS

"Protocols at U Interface for Accessing Data Networks using ATM/DSL;" DSL Forum; Aug. 2001.*

Indonesian Office Action, with English Translation, issued in Corresponding Indonesian Patent Application No. W-00200400702, dated on Dec. 30, 2005.

Japanese Office Action for Corresponding Application No. JP 2003-539208 Mailed Jan. 16, 2007.

Croft B., et al. "Bootstrap protocol (BOOTP)" Sep. 1985.

McAuley A., et al. "Dynamic Registration and Configuration Protocol (DRCP)" Jul. 14, 2000.

Laubach M., et al. "Classical IP and ARP over ATM" Apr. 1998.

* cited by examiner

| Bit31 | Bit8 | Bit16 | Bit24 | Bit32 |
|---|---|---|---|---|
| Subnet ID | | | | |
| | | | | |
| | | | | |
| | | | | |

Subnet ID: filled in by client

Fig.6

| Field Name | Length | Description |
|---|---|---|
| Subnet ID. | 1 byte | 128~255: filled in by base station |
| Other bytes | 15 bytes | Reserved, 0 |

Fig.7

METHOD FOR ESTABLISHING IPOA CHANNEL-BASED OPERATION AND MAINTENANCE CHANNELS

FIELD OF THE INVENTION

The present invention relates to data channels in wireless communication systems. In particular, it relates to a method for establishing operation and maintenance channels at Iub interfaces between two base stations in UTRANs for WCDMA cellular mobile communication systems.

BACKGROUND OF THE INVENTION

As wireless communication technology develops, communication networks become more and more sophisticated and bulky. As a result, the criteria for network maintainability become higher. However, due to default maintenance channels of base stations have not been defined in the protocols of 3G wireless communication networks for WCDMA and CDMA2000 communication systems, it is impossible for base stations to automatically complete far-end auto-configuration, which brings inconvenience to network maintenance. Presently, there are mainly two methods for establishing maintenance channels for base stations: the first one is that maintenance personnel manual configures related data at base stations (NodeB) and base station controllers, so as to configure special operation and maintenance channels to solve base station startup problem. However, due to the fact that access devices are usually far from the network in actual applications, the fatal defect of this method is that near-end base station's O&M data configuration is in great difficulty, if the corresponding physical base station is far from the base station controller or this base station is in a remote and/or desert area. In addition, it is inconvenient for failure treatment. The second method is: At initial startup of all base stations, requests are submitted to the operation and maintenance center with preset PVCs and IP addresses, to obtain formal configuration data. For subsequent startups, the formally configured PVCs and IP addresses will be used to contact with the operation and maintenance center, and the original PVCs and IP information will be deleted. However, the fatal defect of this method is that it is difficult to implement when the operation and maintenance center is at far end. In addition, because all base stations use fixed IP addresses, they can't be launched at the same time; otherwise, the operation and maintenance center is unable to identify the base stations. Further, the operation and maintenance and network management are complex during startup of the base stations. Furthermore, operation and maintenance channels can't be established at base stations automatically, and manual intervention is necessary in case of data loss after startup of the base stations.

In conclusion, the main defect of existing methods for establishing operation and maintenance channels for base stations is that the mechanism for automatically establishing operation and maintenance channels is unavailable. Therefore, the operation of establishing operation and maintenance channels is difficult, labor-intensive, and error-prone, and thus causing increased maintenance costs and degraded quality.

SUMMARY OF THE INVENTION

The purpose of the invention is to provide a method for establishing IPOA-based default operation and maintenance channels, to enable automatic establishment of operation and maintenance channels for base stations and implement maintenance functions such as program and data auto configuration, so as to enhance network maintainability, reduce operation and maintenance costs, and improve operation and maintenance quality.

In order to achieve above purposes, this invention provides a method for automatically establishing IPOA channel-based default operation and maintenance channels, comprising:

(1) establishing a default PVC between a base station and a base station controller;

(2) initiating a BOOTP request at the base station in broadcast mode, and sending the BOOTP request to the operation and maintenance center with the default PVC;

(3) the operation and maintenance center sending a response to the base station, the response containing an IP address assigned to the base station;

(4) establishing an IPOA (IP over ATM) channel in accordance with the IP address and the default PVC, so as to establish an operation and maintenance channel between the base station and the base station controller.

In one embodiment, the IPOA channel is established with default configuration of the base station in step (1).

In one embodiment, the BOOTP request is submitted to the operation and maintenance center via a route of the base station controller in step (2).

In one embodiment, the response is sent from the operation and maintenance center to the base station via the base station controller in step (3).

In view of the above, this invention provides a method to establish IPOA channels between base stations and base station controllers with default PVC configurations of the base stations. BOOTP requests are submitted from the base stations to an operation and maintenance center, and the operation and maintenance center sends responses to the corresponding base stations with assigned IP addresses, and thus to establish operation and maintenance channels between the base stations and the base station controllers. Accordingly, this invention can automatically establish operation and maintenance channels when base station is powered on, which can prevent IP address conflicts and implement parallel launching of base stations. In addition, with the method described in this invention, operation of establishing operation and maintenance channels is simple, light in workload, and reliable, and thus program and data auto-loading as well as configuration and maintenance of base station at far end (i.e., the operation and maintenance center) can be achieved. The method of this invention is superior in quality and low cost in maintenance, which can be applied to various networking patterns, such as star-type, chain-type, and tree-type networks.

BRIEF DESCRIPTION OF DRAWINGS

FIG. 6 shows a format of a physical address used in the embodiment shown in FIG. 5.

FIG. 7 is a description chart of the format of physical address shown in FIG. 6.

EMBODIMENTS OF THE INVENTION

Hereunder the invention is further described with reference to the attached drawings.

This invention is mainly based on the following presumptions: 1. ATM transmission technology is used between base station and base station controller; 2. physical connection between base station and base station controller is ready.

Figure 1:
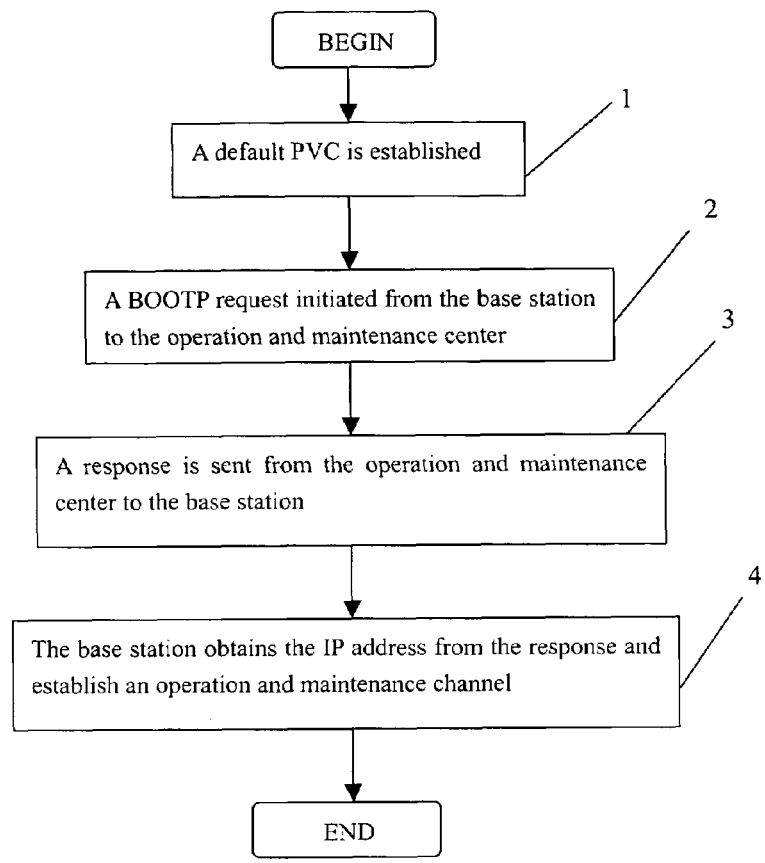
FIG. 1 shows a flow chart of an embodiment of this invention.

FIG. 1 shows a flow chart of an embodiment of this invention. As shown in FIG. 1, a default PVC is established between a base station and a base station controller with the default PVC configuration (step 1). Then, according to the default PVC, a BOOTP request is submitted from the base station in broadcast mode to an operation and maintenance center of a system via a route of the base station controller (step 2). Afterwards, the operation and maintenance center assigns an IP address to the base station by filling the IP address in the BOOTP response packet, and sends the BOOTP response to the base station controller, which then sends the BOOTP response to the base station (step 3). Finally, the base station obtains the IP address, and establishes an IPOA channel according to the obtained IP address and the default PVC, so that an operation and maintenance channel between the base station and the base station controller is established. Thus, an IPOA channel-based operation and maintenance channel between the base station and the base station controller is established successfully (step 4).

Figure 2:
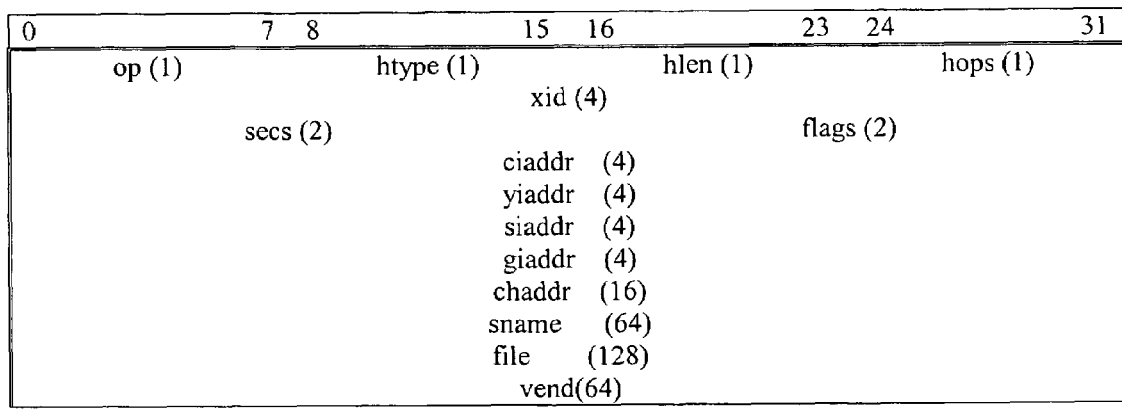
FIG. 2 shows a format of a BOOTP request packet used in this invention.

The BOOTP request packet initiated from the base station in step 2 contains the following fields (see FIG. 2 for detailed format):

Packet operating code (op), designed to indicate BOOTP packet type;

Hardware address type (htype), designed to indicate hardware address type;

Hardware address length (hlen), designed to indicate hardware address length;

Hardware operation setting (hops), designed to indicate the number of gateways passed through;

Processing ID (xid), designed to match a BOOTP request and its corresponding BOOTP response;

Elapsed seconds (secs), designed to indicate the time passed since startup of the client;

Client IP address (cirddr), designed to indicate client IP address;

Own IP address (yiaddr), designed to indicate the client IP address filled in by the server;

Server IP address (siaddr), designed to indicate the server IP address filled in by the server;

Gateway IP address (giaddr), designed to indicate the gateway address passed;

Client hardware address (chaddr), designed to indicate hardware address of the client. In this invention, in case the base station doesn't know its own hardware address, special treatment will be carried out in this field so that the base station controller and the maintenance terminal can identify the base station that sends BOOTP request;

Optional server name (sname), designed to indicate the optional server name;

Boot file name (file), designed to indicate the file name to be loaded;

Optional vender domain (vend), designed to indicate vendor-defined domain.

In this invention, the base station controller can utilize this domain to facilitate routing.

In one embodiment of this invention, in view that a physical connection (UNI-based physical connection, IMA-based physical connection, or any other physical connection) has been established between the base station and the base station controller, the base station can identify the type of connection by listening to messages on the link, so as to obtain the data of the physical link configured by the base station controller. For example, for an IMA-based physical connection, the base station can obtain the information of the physical IMA link by listening to ICP units in IMA frames, so as to establish a default PVC. Because there is no channel between the base station and the base station controller before a default IPOA channel is created, the base station cannot interact with the base station controller. Therefore, default PVC mode is necessary. For example, VPI=1/VCI=0 may be used.

After the default PVC is confirmed, the base station can initiate a BOOTP request to apply for an IP address. When the base station controller detects a BOOTP request from the base station, it would forward the BOOTP request packet to the operation and maintenance center, and ensure that the operation and maintenance center can identify the base station that sends the BOOTP request packet, in order to assign an IP address to the base station. Therefore, if the operation and maintenance center is external to the base station controller, then the base station controller needs to process the BOOTP request packet. For example, it may add PVC information in the client hardware address (chaddr) field of the BOOTP packet, to make sure that the external operation and maintenance center can identify the base station that sends the BOOTP request packet. In addition, the base station controller should forward the BOOTP response from the operation and maintenance center to the base station, so that the base station can obtain the IP address assigned to it. In actual application, information such as file name of the program to be loaded and file path can be obtained as required. The base station will establish an IPOA channel according to the obtained IP address. After the IPOA channel between the base station and the base station controller is established, the program and data of the base station can be loaded through that channel.

Figure 3:
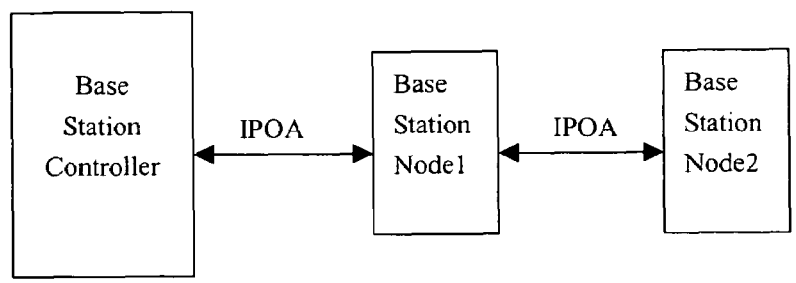
FIG. 3 is a schematic diagram of establishing an operation and maintenance channel for base stations in a chain-type network according to this invention.
Figure 4:
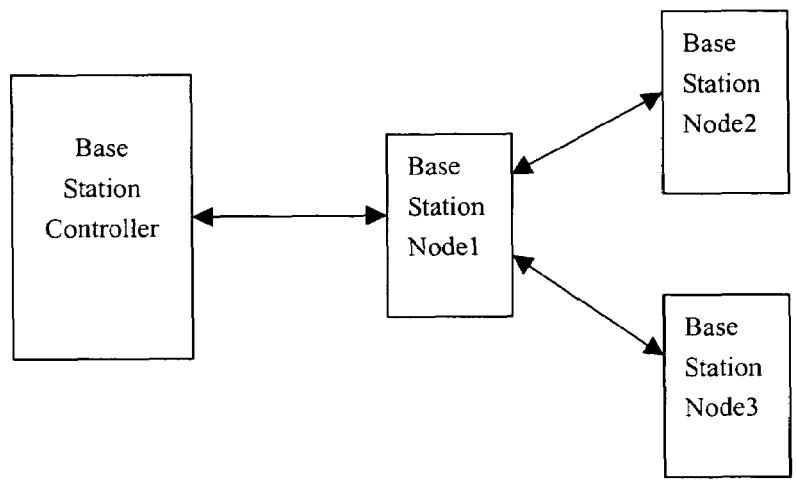
FIG. 4 is a schematic diagram of establishing an operation and maintenance channel for base stations in a tree-type network.

FIG. 3 shows schematic diagrams of establishing operation and maintenance channels for base stations in chain-type and tree-type networking pattern, respectively. Base stations start up level by level, i.e., the base station at lower level can start up only after the base station at higher level starts up. For star-type networking pattern with respect to the base station controller, the base stations can start up in parallel. As shown in the above figures, the base station connected directly to the base station controller starts up first, so as to obtain program and configuration data to operate normally. Other base station(s) connected to the above base station also initiate BOOTP request(s) in broadcast mode through default PVC(s) with above method. The configuration data of the base station that starts up first contains configuration data of the PVC cross connection; furthermore, an IPOA channel has been established between that base station and the base station controller according to the configuration data. Therefore, the base station that starts up first is only required to perform PVC switching at the corresponding port; whereas the base station controller treats other base station(s) in the same manner as it treats with the base station that starts up first. When a base station at the lower level receives the BOOTP response and obtains the IP address, an IPOA channel between it and the base station at the higher level is established. Due to the fact that a PVC connection has been established between the base station at the higher level and the operation and maintenance center, a connection between the current level base station and the operation and maintenance center is also established. In this way, each base station can start up automatically. However, the operation and maintenance channel(s) of the base station(s) at the lower level can be established only after the base station at the higher level starts up.

Figure 5:
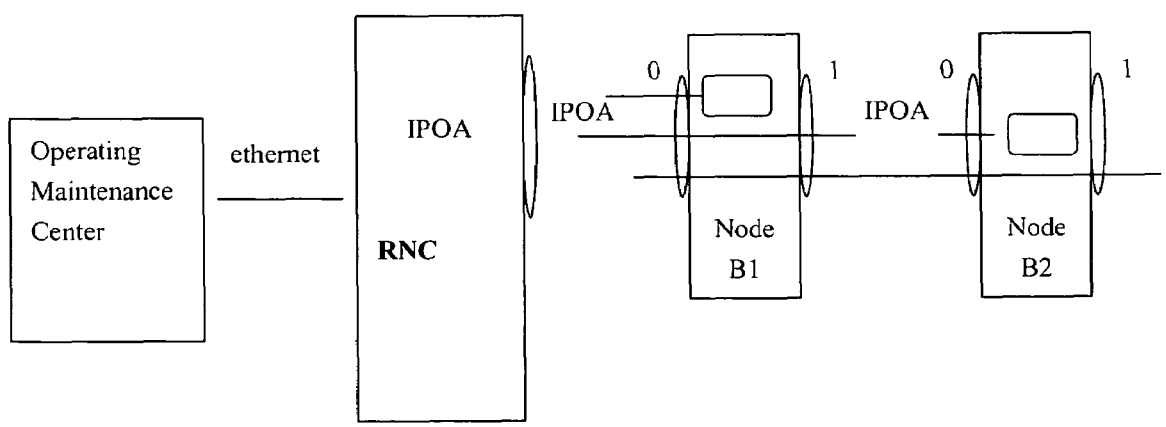
FIG. 5 shows a structural diagram of UTRAN chain-type network using WCDMA system according to one embodiment of this invention.

FIG. 5 shows a structural diagram of UTRAN chain-type network using WCDMA system according to one embodiment of this invention. As shown in FIG. 5, UTRAN base stations are in chain networking pattern, and the operation and maintenance center is at far end. E1 connection (not shown in FIG. 5) and IMA-based ATM transmission are utilized between NodeB and RNC.

First, NodeB1 obtains IMA configuration information by listening to ICP units in IMA frames on E1 link (not shown in FIG. 5). Assuming that the default PVC is contained in the IMA group with the minimal link number, a default PVC (VPI=1; VCI=0) is ready between NodeB1 and RNC, and NodeB initiates the BOOTP request in broadcast mode. The parameters of the BOOTP packet are as follows:

op=1; htype=1; hlen=6; hops=0; xid=a random number (make sure that each base station has its unique number by use of an algorithm, or by use of local time directly); secs=0; flags=0; ciaddr=0; yiaddr=0; siaddr=0; giaddr=0; chaddr=see FIG. 6 and FIG. 7 for the format; sname=0 (stand-by); file=0 (stand-by); vend=0.

When the BOOTP agent of RNC (base station controller) or the BOOTP server detects the BOOTP request packet, it makes necessary treatment to the BOOTP request packet. For example, it adds information (e.g., PVC and socket information) in "chaddr" field to enable the far-end maintenance center to identify NodeB. If modifications have been made to the "giaddr" information at different gateways, then gateway information needs to be added. At the same time, "hops" is increased by 1, and "secs" is modified. Then, RNC forwards the BOOTP packet to the far-end maintenance center. When the far-end maintenance center receives that BOOTP request, it assigns an IP address according to "chaddr", and fills IP address information with file name and path into a BOOTP response packet, and then sends out the BOOTP response packet. When RNC receives the response packet, it routes and forwards that BOOTP response packet to the default PVC of Iub. Thus, NodeB1 receives the BOOTP response packet and obtains IP address from the packet; and then it creates an IPOA device and attaches the default PVC to the IPOA device, so that an IPOA operation and maintenance channel is established. Of course, filename and path may also be included in the BOOTP response packet if necessary, so that the base station can load the program according to the filename and path.

Hereunder we describe the chain-type connection.

Because the far-end maintenance center has set the PVC configuration information between Node1 and RNC, after Node1 starts up and operates normally, it receives the configuration data and establishes connection with RNC according to the configuration data. The configuration data contains information of the PVC channel between NodeB1 and RNC, which is used by the operation and maintenance channel for Node2. Assuming that the PVC is: VPI=1; VCI=33.

After NodeB2 powers on, it also initiates a BOOTP request through a default PVC (VPI=1; VCI=0). Node1 receives the BOOTP request on the default PVC channel at a port and performs PVC switching according to the preset PVC cross connection. In this way, the BOOTP request is switched to the above PVC (VPI=1, VCI=33). Then, RNC makes the same treatment to the BOOTP request packet and forwards it to the far-end maintenance center to obtain IP address and file name/path. Then, the far-end maintenance center sends out a BOOTP response, which is forwarded by RNC. NodeB2 receives the BOOTP response via the PVC switching of NodeB1. In this way, an IPOA connection between NodeB2 and the far-end maintenance center is established.

Above method can also be applied to hierarchical networking pattern. In addition, it can be applied to ring-type and tree-type networking patterns as well.

The invention claimed is:

1. A method for establishing an IPOA (Internet Protocol Over Asynchronous Transfer Mode) channel-based operation and maintenance channel, comprising:
   establishing a PVC (Permanent Virtual Circuit) between a base station and a base station controller;
   initiating a BOOTP (Bootstrap Protocol) request at the base station in broadcast mode, and sending the BOOTP request to an operation and maintenance center through the PVC;
   the operation and maintenance center sending a response to the base station, the response containing an IP address allocated to the base station; and
   establishing an IPOA channel in accordance with the IP address and the PVC, so as to establish an operation and maintenance channel between the base station and the base station controller.

2. The method for establishing an IPOA channel-based operation and maintenance channel as in claim 1, wherein the PVC is established with a configuration of the base station.

3. The method for establishing an IPOA channel-based operation and maintenance channel as in claim 1, wherein the BOOTP request is submitted to the operation and maintenance center via a route of the base station controller.

4. The method for establishing an IPOA channel-based operation and maintenance channel as in claim 1, wherein the response is sent from the operation and maintenance center to the base station via the base station controller.

5. The method for establishing an IPOA channel-based operation and maintenance channel as in claim 1, wherein the BOOTP request initiated from the base station comprises the following fields:
   packet operating code (op), designed to indicate BOOTP packet type;
   hardware address type (htype), designed to indicate hardware address type;
   hardware address length (hlen), designed to indicate hardware address length;
   hardware operation setting (hops), designed to indicate number of gateways passed through;
   processing ID (xid), designed to match the BOOTP request with its BOOTP response;
   elapsed seconds (secs), designed to indicate time passed since startup from a client end;
   client IP address (cirddr), designed to indicate client IP address;
   own IP address (yiaddr), designed to indicate client IP address filled in by a server;
   server IP address (siaddr), designed to indicate server IP address filled in by the server;
   gateway IP address (giaddr), designed to indicate gateway address passed;
   client hardware address (chaddr), designed to indicate hardware address of the client end;
   optional server name (sname), designed to indicate optional server name;
   boot file name (file), designed to indicate file name to be loaded;

optional vendor domain (vend), designed to indicate vendor-defined domain.

6. The method for establishing an IPOA channel-based operation and maintenance channel as in claim 5, wherein the operation and maintenance center is external to the base station controller, and PVC information is added in a client hardware address (chaddr) by the base station controller to identify the base station that sends the BOOTP request.

7. A method for establishing an operation and maintenance channel, comprising:
- establishing a PVC (Permanent Virtual Circuit) between a base station and a base station controller;
- initiating a BOOTP (Bootstrap Protocol) request at the base station in broadcast mode, and sending the BOOTP request to an operation and maintenance center through the PVC;
- receiving a response from the operation and maintenance center, the response containing an IP address allocated to the base station; and
- establishing an IPOA channel in accordance with the IP address and the PVC, wherein the IPOA channel is the operation and maintenance channel between the base station and the base station controller.

8. The method for establishing an operation and maintenance channel as in claim 7, wherein the PVC is established with a configuration of the base station.

9. The method for establishing an operation and maintenance channel as in claim 7, wherein the BOOTP request is submitted to the operation and maintenance center via a route of the base station controller.

10. The method for establishing an operation and maintenance channel as in claim 7, wherein the response is sent from the operation and maintenance center to the base station via the base station controller.

11. A communication system comprising:
- a base station controller; and
- a base station configured to:
- establish a PVC (Permanent Virtual Circuit) between the base station and the base station controller;
- initiate a BOOTP (Bootstrap Protocol) request at the base station in broadcast mode, and send the BOOTP request to an operation and maintenance center through the PVC;
- receive a response from the operation and maintenance center, the response containing an IP address allocated to the base station; and
- establish an IPOA channel in accordance with the IP address and the PVC, wherein the IPOA channel is the operation and maintenance channel between the base station and the base station controller.

* * * * *